United States Patent Office 3,524,852
Patented Aug. 18, 1970

3,524,852
PREPARATION OF CYANURIC CHLORIDE
Wilhelm Gruber, Darmstadt, and Peter Quis, Gross Zimmern, Kreis Dieburg, Germany, assignors to Rohm & Haas G.m.b.H., Darmstadt, Germany
No Drawing. Filed Mar. 4, 1968, Ser. No. 709,868
Claims priority, application Germany, Mar. 18, 1967,
R 45,542
Int. Cl. C07d 55/42
U.S. Cl. 260—248                                                4 Claims

ABSTRACT OF THE DISCLOSURE

Reaction of cyanogen with chlorine in the gaseous phase at 350 to 750° C. in the presence of an activated charcoal catalyst is improved by operating with a molar excess of chlorine, preferably at a temperature of 380 to 460° C., and preferably in a reactor having an interior ceramic surface.

---

It has already been suggested, in German Pat. 1,068,265, to react cyanogen with chlorine in equimolar amounts at 350 to 750° C. in the presence of activated charcoal to produce cyanuric chloride or tricyanogen chloride. This direct preparation of cyanuric chloride represented a considerable advance over processes described and practiced earlier, in which cyanogen chloride was first prepared from a cyanide or hydrocyanic acid and chloride and then subjected to trimerization. Unfortunately, however, it has the disadvantage that the catalytic activity of the activated charcoal becomes diminished, thus necessitating frequent and expensive regeneration of the catalyst and interruption of the process. The patent referred to indicates that the catalyst can be activated by heating it to 800 to 1000° C. in a stream of nitrogen.

We have found that significantly better results are obtainable by maintaining the molar ratio of the cyanogen and chlorine reactants within the range of 1:1.05 to 1:1.4, and preferably at about 1:1.2. A 20% molar excess of chlorine yields optimum results. However, significantly better results are also obtainable when the molar excess of chlorine is as little as 5% or as much as 40%.

The temperature in the reaction zone may, as set forth in the patent, be within the range of 350 to 750° C., but we have found it particularly advantageous to operate within a narrower range of 380 to 460° C. Furthermore, we have found it most desirable, in order to avoid gradual contamination of the catalyst with ferric chloride due to corrosion of the stainless steel reaction tube heretofore used and consequent formation of cyanogen chloride as an undesirable by-product, to carry out the reaction in a reactor having an interior ceramic surface, i.e., a ceramic tube or a tube lined with ceramic material. Quartz, porcelain, as well as all heat and corrosion resistant metal oxides, such as magnesium oxide, zirconium oxide and beryllium oxide, are suitable as materials, and enamelled reaction tubes are also effective.

The unexpectedly superior results obtainable by the method of the invention are manifested in higher yields of cyanuric chloride and extraordinarily longer catalyst life. There is an indication in the aforementioned patent that it is advantageous to be content with an incomplete conversion, e.g., of 60 to 80%, and to recycle the remaining cyanogen and chlorine with the starting gas mixture. In the example of this patent, the conversion to cyanuric chloride is stated to be 56.5%. If the procedure described in the patent is continued for sometime, an appreciable reduction in catalytic efficacy can be noted after only a few hours.

In the examples included hereinafter, tests are described in which all conditions except the molar ratio of cyanogen to chlorine are identical. These comparative tests show that the rate of conversion to cyanuric chloride is not only higher initially when there is an excess of chlorine, but that the conversion rate remains virtually unchanged, whereas when equimolar amounts of cyanogen and chlorine are used, the conversion rate is reduced from an initial value of 80% to approximately 50% after only twenty hours of operation. In contrast, with a 20% molar excess of chlorine the initial conversion rate is about 95%, and remains practically unchanged after one month of operation.

These and other advantages, as well as preferred operating procedures, will become apparent from the following examples.

EXAMPLES

A 700 mm. high layer of finely granulated charcoal activated with superheated steam was introduced into an externally and electrically heated quartz tube having a length of one meter and an inside diameter of 24 mm. Three test runs were conducted at 410 to 430° C. by passing 0.322 mol per hour of cyanogen and:

Test I—0.322 mol per hour chlorine (equimolar amounts)
Test II—0.354 mol per hour chlorine (10% excess)
Test III—0.386 mol per hour chlorine (20% excess)

through the tube.

The cyanuric chloride was separated at regular intervals from the gases leaving the reaction tube and weighed. The yields, in percent of theoretical yield based on cyanogen, are shown in the following table.

| Test No.       | I     | II    | III |
|----------------|-------|-------|-----|
| Yield after:   |       |       |     |
| 1 hr           | 82    | 95    | 96  |
| 5 hrs          | 80    | 95    | 96  |
| 10 hrs         | 78    | 95    | 95  |
| 15 hrs         | 70    | 94    | 95  |
| 20 hrs         | 53    | 96    | 96  |
| 50 hrs         | (¹)   | 96    | 94  |
| 80 hrs         |       | 95    | 95  |
| 100 hrs        |       | 94    | 94  |
| 150 hrs        |       | 94    | 95  |
| 200 hrs        |       | 93    | 93  |
| 700 hrs        |       | (¹)   | 85  |

¹ Discontinued.

We claim:
1. In a process for preparing cyanuric chloride by reaction of cyanogen with chlorine in the presence of activated charcoal at a temperature within the range of 350 to 750° C., the improvement which comprises maintaining the molar ratio of the cyanogen and chlorine reactants at between 1:1.05 and 1:1.4.
2. Process as defined in claim 1 wherein the molar ratio is about 1:1.2.
3. Process as defined in claim 1 wherein the reaction temperature is maintained at from 380 to 460° C.
4. Process as defined in claim 1 wherein the reaction is carried out in a reactor having an interior ceramic surface.

References Cited
UNITED STATES PATENTS
2,491,459  12/1949  Thurston _____ 260—248
2,762,798   9/1956  Hardwicke et al. _____ 260—248
3,023,077   2/1962  Mastrangelo.

FOREIGN PATENTS
1,068,265  11/1959  Germany.
1,111,201   7/1961  Germany.

HENRY R. JILES, Primary Examiner
J. M. FORD, Assistant Examiner